Patented Aug. 7, 1945

2,381,366

UNITED STATES PATENT OFFICE 2,381,366

ORGANO-DIHALOGENOSILOXANES

Winton I. Patnode, Schenectady, N. Y., assignor to General Electric Company, a corporation of New York No Drawing. Application October 29, 1942,
Serial No. 463,812

8 Claims. (Cl. 260—607)

This invention relates to new chemical compounds of silicon, oxygen, a halogen, and a plurality of monovalent lower aliphatic hydrocarbon radicals, and to the preparation thereof. It is more specifically concerned with, and has as its principal object, the preparation of novel organo-dihalogenosiloxanes having the general formula $$X[SiR_2O]_nSiR_2X$$

wherein X represents a halogen atom, particularly a chlorine atom, R represents a monovalent lower alkyl group, particularly a methyl group, and $n$ is an integer equal to at least one, and preferably not more than 5. Such compounds are useful for divers purposes. For example, inasmuch as the halogen atoms are reactive, the compounds may be used as intermediates in the preparation of more complex liquid or solid organo-silicon compounds such as silicone resins.

In order that the nature of the invention may become apparent, there are listed hereinbelow representative compounds which fall within the scope of the invention 1. Tetramethyl-1,2-dichlorodisiloxane $Cl(CH_3)_2Si$—$O$—$Si(CH_3)_2Cl$ 2. Tetraethyl-1,2-dibromodisiloxane $Br(C_2H_5)_2Si$—$O$—$Si(C_2H_5)_2Br$ 3. Hexamethyl-1,3-dichlorotrisiloxane $Cl[Si(CH_3)_2O]_2Si(CH_3)_2Cl$ 4. Decamethyl-1,5-dichloropentasiloxane $Cl[Si(CH_3)_2O]_4Si(CH_3)_2Cl$ 5. Tetraethyl-1,2-dichlorodisiloxane $Cl(C_2H_5)_2Si$—$O$—$Si(C_2H_5)_2Cl$ In the system of nomenclature adopted in naming the above compounds, the individual silicon atoms in the Si—O—Si chain have been designated by numerals, the S—O group in which the oxygen is connected to a second silicon atom has been called a "siloxy" group, and the compound containing them a "siloxane." On this basis the compound $H_3Si$—$O$—$SiH_3$ is known as disiloxane with the prefix indicating the number of silicon atoms in the chain. The system resembles somewhat the Geneva system of nomenclature of organic compounds.

I have discovered that the novel compounds of the type represented by the formula $$X[SiR_2O]_nSiR_2X$$

wherein R, X, and $n$ have the meanings indicated hereinbefore may be prepared by hydrolysis of a dihalogeno-organosilicon compound of the formula $R_2SiX_2$ under such conditions as will avoid or minimize the formation of completely hydrolyzed or condensed silicones. These conditions are met by (1) the use of less than one mol of water for the partial hydrolysis of one mol of the compound $R_2SiX_2$, and (2) the solution and dilution of both reactants, i. e. the compound $R_2SiX_2$ and the water, in inert liquids which are solvents for the reactants, for each other, and for the products of the reactants, in order to maintain a one-phase system during the course of the reaction.

My invention, although not limited thereto, will be described with particular reference to the preparation of polymethyldichlorosiloxanes of the formula $$Cl[(CH_3)_2SiO]_nSi(CH_3)_2Cl$$

from dimethyldichlorosilane.

*Example.*—Two liters of dimethyldichlorosilane and two liters of dry ether were placed in a 5 liter, 3-neck flask fitted with a high-speed stirrer, a dropping funnel with a drawn-down tip which dipped below the surface of the solution and a reflux condenser cooled with solid carbon dioxide and acetone. One hundred fifty c. c. of water was dissolved in an equal quantity of dioxane, and placed in the dropping funnel. These quantities of reactants represent 16.6 mols of $(CH_3)_2SiCl_2$ and 8.3 mols of water. The stirrer was started and the aqueous solution was added slowly. The droplets of aqueous solution issuing from the tip of the dropping funnel apparently dissolved immediately, there being no visible haze which would indicate a two-phase system. At first the temperature of the reaction mixture rose slightly, but very soon it became saturated with HCl. From this point on, the temperature fell to below room temperature and the HCl boiled out carrying with it some liquid which was condensed and returned to the flask. The aqueous solution was added at such a rate as would maintain a continuous, gentle refluxing of the reaction mixture. When all of the water had been added, the reaction mixture was fractionally distilled at atmospheric pressure and at 20 mm. The ether and dioxane were discarded. The other products recovered are listed in Table I in their proportions.

TABLE I

| Compound | Volume, c. c. | Percent |
|---|---|---|
| $(CH_3)_2SiCl_2$ | 315 | 22 |
| $Cl[(CH_3)_2SiO]_1(CH_3)_2SiCl$ | 415 | 28 |
| $Cl[(CH_3)_2SiO]_2(CH_3)_2SiCl$ | 355 | 24 |
| $Cl[(CH_3)_2SiO]_3(CH_3)_2SiCl$ | 210 | 15 |
| $Cl[(CH_3)_2SiO]_4(CH_3)_2SiCl$ | 85 | 6 |
| $Cl[(CH_3)_2SiO]_5(CH_3)_2SiCl$ | 40 | 3 |
| Residue | 30 | 2 |

The recovery of products containing silicon represented a yield of about 80% based upon the original $(CH_3)_2SiCl_2$. The high losses were due to frequent handling of the products and repeated distillations. The remarkable thing about the products of reaction, however, is that no completely hydrolyzed compounds of the type $[(CH_3)_2SiO]_x$ were found in the reaction products, unless they were present in the small quantity of high-boiling residue. It has been found to be a fact, however, that no appreciable quantities of this type of compound are formed by this method of hydrolysis, whereas hydrolysis of $(CH_3)_2SiCl_2$ in a two-phase reaction mixture such as that described in Rochow Patent 2,258,218 leads chiefly to the completely hydrolyzed compounds. The properties of the compounds listed in Table I are given in Table II.

TABLE II

*Properties of compounds of the formula*

$$Cl[(CH_3)_2SiO]_n(CH_3)_2SiCl$$

| Value of $n$ | Freezing point | Boiling point °C. | | Density at 20° C. g./cc. | Per cent chlorine | |
|---|---|---|---|---|---|---|
| | | 20 mm. | 760 mm. | | Found | Theory |
| | °C. | | | | | |
| 1 | −37.5 | 41 | 138 | 1.038 | 34.92; 34.86 | 34.93 |
| 2 | −53 | 79 | 184 | 1.018 | 25.31; 25.60 | 25.59 |
| 3 | −62 | 111 | 222 | 1.011 | 20.15; 20.09 | 20.19 |
| 4 | <−80 | 138 | | 1.005 | 16.64; 16.74 | 16.67 |
| 5 | <−80 | 161 | | 1.003 | 14.41; 14.36 | 14.20 |

Analysis for chlorine was carried out by hydrolysis of the compounds in ether solution and titration of the liberated HCl with 0.5N NaOH.

The higher members of the series may be prepared in larger quantities by following a similar procedure, but using a higher proportion of water. Likewise, other organo-silicon halides, such as diethyl- or dipropyl-dihalogenosilanes, may be substituted for the dimethyl-dichlorosilane of the example to prepare the corresponding halogenated partial hydrolysis products having ethyl or propyl groups attached to the silicon atoms.

What I claim as new and desire to secure by Letters Patent of the United States, is:

1. Organo-silicon compounds having the formula $$X[SiR_2O]_nSiR_2X$$

wherein X represents a halogen atom, R represents a monovalent lower alkyl group, and $n$ is a whole number and is equal to at least one.

2. Organo-silicon compounds having the formula $$Cl[R_2SiO]_nSiR_2Cl$$

wherein R represents a monovalent lower alkyl radical and $n$ is a whole number and is equal to at least one.

3. Organo-silicon compounds having the formula $$Cl[R_2SiO]_nSiR_2Cl$$

wherein R represents a methyl radical and $n$ is a whole number and is equal to at least one and not more than five.

4. Tetramethyl-1,2-dichlorodisiloxane.
5. Hexamethyl-1,3-dichlorotrisiloxane.
6. Octamethyl-1,4-dichlorotetrasiloxane.
7. The process of preparing siloxane derivatives having the general formula $$X[R_2SiO]_nSiR_2X$$

wherein X represents a halogen atom, R represents a monovalent lower alkyl group, and $n$ is an integer equal to at least one, which comprises partially hydrolyzing an organo-halogenosilane of the formula $R_2SiX_2$ wherein R and X have the meanings indicated above by slowly adding a solution of water in an inert organic liquid to a solution of said halogenosilane in a second inert organic liquid in the relative proportions of one mol organo-halogenosilane to less than one mol water, the said organic liquids being solvents for each other and for the hydrolysis products.

8. The process of preparing siloxane compounds of the formula $$Cl[(CH_3)_2SiO]_nSi(CH_3)_2Cl$$

wherein $n$ is an integer equal to at least one, which comprises slowly adding a solution of water in dioxane to an agitated solution of dimethyldichlorosilane in ether in the relative proportions of one mol dimethyldichlorosilane to less than one mol water.

WINTON I. PATNODE.